(12) United States Patent
Yamaguchi

(10) Patent No.: US 10,825,136 B2
(45) Date of Patent: Nov. 3, 2020

(54) IMAGE PROCESSING APPARATUS AND METHOD, AND IMAGE CAPTURING APPARATUS

(71) Applicant: CANON KABUSHIKI KAISHA, Tokyo (JP)

(72) Inventor: Shota Yamaguchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 76 days.

(21) Appl. No.: 16/122,040

(22) Filed: Sep. 5, 2018

(65) Prior Publication Data

US 2019/0080435 A1   Mar. 14, 2019

(30) Foreign Application Priority Data

Sep. 13, 2017  (JP) ................................ 2017-175797

(51) Int. Cl.
```
G06K 9/00      (2006.01)
G06T 3/40      (2006.01)
H04N 5/232     (2006.01)
H04N 9/64      (2006.01)
H04N 9/07      (2006.01)
```

(52) U.S. Cl.
CPC ....... *G06T 3/4015* (2013.01); *H04N 5/23229* (2013.01); *H04N 9/07* (2013.01); *H04N 9/646* (2013.01)

(58) Field of Classification Search
CPC .... G06T 3/4015; H04N 5/23229; H04N 9/07; H04N 9/646

USPC ......................................................... 382/167
See application file for complete search history.

(56) References Cited

U.S. PATENT DOCUMENTS

| | | | |
|---|---|---|---|
| 7,170,632 B1* | 1/2007 | Kinjo ..................... | G03B 17/24 |
| | | | 348/231.3 |
| 9,240,037 B2* | 1/2016 | Yamaguchi ............. | G06T 5/008 |
| 9,542,734 B2* | 1/2017 | Kimura .................. | H04N 9/045 |
| 9,692,985 B2* | 6/2017 | Yamaguchi ............. | G06T 5/008 |
| 10,218,953 B2* | 2/2019 | Yamaguchi ............ | H04N 5/235 |
| 10,298,853 B2* | 5/2019 | Yamaguchi ........ | H04N 5/23245 |

(Continued)

FOREIGN PATENT DOCUMENTS

JP   2013223152 A   10/2013

*Primary Examiner* — Marceau Milord
(74) *Attorney, Agent, or Firm* — Carter, DeLuca & Farrell LLP

(57) ABSTRACT

An image processing apparatus comprises: first and generation units that generate color signal components for luminance and color signal components for color difference, respectively, in a first color space from an input image signal; an integration unit that integrates the color signal components for luminance and color difference to generate color signal components common for luminance and color difference; a processing unit that performs nonlinear processing on the color signal components common for luminance and color difference; a separation unit that generates luminance and color difference signals in a second color space from the signal that has undergone the nonlinear processing; and a band limiting unit that performs band limitation processing on the color difference signals. A characteristic of the band limitation processing is set on the basis of frequency characteristics of the luminance color difference signals.

17 Claims, 9 Drawing Sheets

(56) References Cited

U.S. PATENT DOCUMENTS

| | | | |
|---|---|---|---|
| 2004/0145664 A1* | 7/2004 | Kobayashi | H04N 5/367 348/246 |
| 2004/0201727 A1* | 10/2004 | Ichikawa | H04N 1/32128 348/223.1 |
| 2005/0058362 A1* | 3/2005 | Kita | H04N 1/4097 382/254 |
| 2005/0175220 A1* | 8/2005 | Kita | H04N 1/4097 382/112 |
| 2005/0195297 A1* | 9/2005 | Kita | H04N 1/4097 348/246 |
| 2005/0275911 A1* | 12/2005 | Yamada | H04N 1/60 358/518 |
| 2006/0098869 A1* | 5/2006 | Chen | H04N 9/045 382/167 |
| 2007/0040914 A1* | 2/2007 | Katagiri | H04N 5/243 348/221.1 |
| 2007/0047019 A1* | 3/2007 | Toyoda | H04N 1/40068 358/448 |
| 2007/0133017 A1* | 6/2007 | Kobayashi | H04N 1/56 358/1.9 |
| 2007/0182830 A1* | 8/2007 | Katagiri | H04N 5/235 348/222.1 |
| 2008/0298789 A1* | 12/2008 | Ohki | H04N 5/23245 396/52 |
| 2009/0074324 A1* | 3/2009 | Ishiga | H04N 9/045 382/282 |
| 2009/0135267 A1* | 5/2009 | Ishiga | H04N 5/3572 348/222.1 |
| 2010/0033597 A1* | 2/2010 | Ikemoto | H04N 5/23229 348/229.1 |
| 2011/0025824 A1* | 2/2011 | Kato | G03B 35/00 348/46 |
| 2012/0218442 A1* | 8/2012 | Jandhyala | G06T 5/50 348/239 |
| 2012/0236173 A1* | 9/2012 | Telek | G03B 17/08 348/223.1 |
| 2013/0162764 A1* | 6/2013 | Masuda | H04N 13/139 348/42 |
| 2014/0247327 A1* | 9/2014 | Masuda | H04N 13/128 348/46 |
| 2015/0015672 A1* | 1/2015 | Iwasaki | H04N 5/23229 348/46 |
| 2015/0181103 A1* | 6/2015 | Kimura | H04N 5/2355 348/360 |
| 2015/0221280 A1* | 8/2015 | Van Der Vleuten | G06T 5/002 382/167 |
| 2018/0352153 A1* | 12/2018 | Matsuda | H04N 5/23229 |

* cited by examiner

DEMOSAICED SIGNAL

OUTPUT SIGNAL

INPUT SIGNAL
(BEFORE PHASE COMPENSATION PROCESSING)

OUTPUT SIGNAL
(AFTER PHASE COMPENSATION PROCESSING)

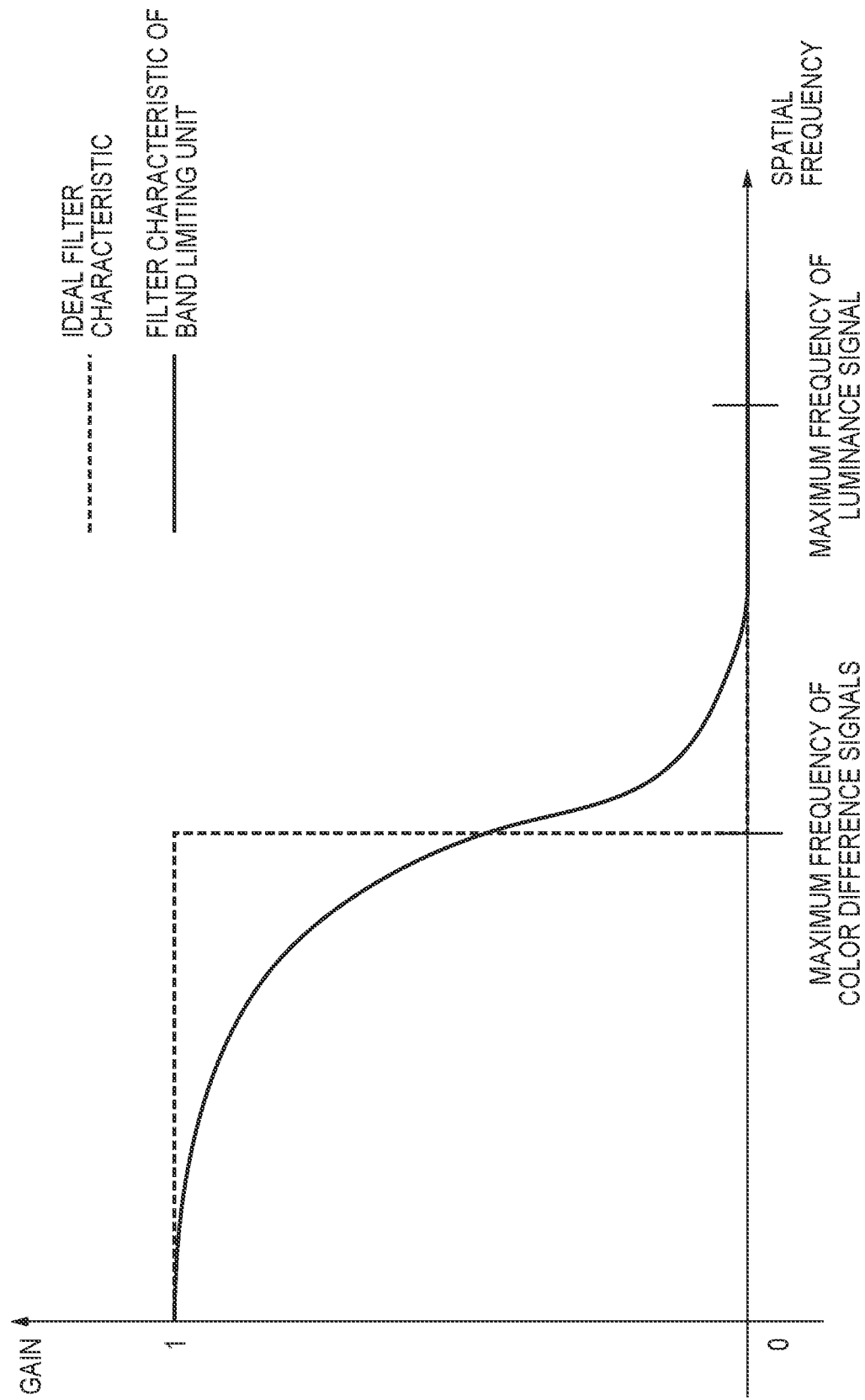

INPUT SIGNAL
(BEFORE THINNING PROCESSING)

OUTPUT SIGNAL
(AFTER THINNING PROCESSING)

DEMOSAICED SIGNAL

OUTPUT SIGNAL

IMAGE PROCESSING APPARATUS AND METHOD, AND IMAGE CAPTURING APPARATUS

BACKGROUND OF THE INVENTION

Field of the Invention

The present invention relates to an image processing apparatus and method, and an image capturing apparatus, and more particularly to an image processing apparatus and method, and an image capturing apparatus for generating a luminance signal and a color signal and generating a signal suitable for outputting to an HDR (High Dynamic Range) monitor.

Description of the Related Art

In recent years, with the increase in the display luminance of a display, a high dynamic range (referred to as "HDR", hereinafter) camera system capable of reproducing the tone on the high luminance side, which has been compressed so far, with tones closer to appearance has been proposed.

Japanese Patent Laid-Open No. 2013-223152 discloses a technique of performing different signal processing on a luminance signal and a color signal and integrating the luminance signal and the color signal that have undergone the signal processing to generate a video signal.

On the other hand, conventionally, there is a case in which, from the viewpoint of human visual characteristics and transmission efficiency, a signal transmission from a camera to an output device is performed by separating a luminance signal and a color difference signal and sending these two kinds of signals by time division multiplexing. In consideration of this transmission, there is a camera in which various image quality enhancement processing in the camera is intermittently applied only to the signal output as the color difference signal to reduce the system load.

In the image processing apparatus disclosed in Japanese Patent Laid-Open No. 2013-223152, the signal processing for a color signal is applied, for example, only to even-numbered phase signals and odd-numbered phase signals are thinned out, and the resultant signals are integrated with luminance-based signals. At this time, if the thinned-out odd-numbered phase signals are generated by copying from adjacent pixel values of the even-numbered phase signals, a centroid of luminance-based signals and a centroid of color difference-based signals deviate from each other. In addition, due to the integration processing of the luminance-based signals and the color difference-based signals, a phenomenon occurs in which the high frequency component included in the luminance-based signals is propagated to color difference signals.

There is a problem that if the predetermined phase of the color difference signal is thinned out and transmitted to a monitor by time division multiplexing at the time of transmission of signals to an output device while these phenomena of centroid deviation and propagation of high frequency components to color difference signals occur, signals are not correctly reproduced on the monitor, and a false signal is generated. Especially in HDR, this phenomenon appears remarkably on the high signal value side.

SUMMARY OF THE INVENTION

The present invention has been made in consideration of the above situation, and generates an image signal with which an HDR monitor can generate an image in which a false signal generation caused by the centroid deviation and the propagation phenomenon of the high frequency component is suppressed.

According to the present invention, provided is an image processing apparatus comprising one or more processors and/or circuitry which functions as: a first generation unit that generates color signal components for luminance in a first color space from an input image signal; a second generation unit that generates color signal components for color difference in the first color space from the image signal; an integration unit that integrates the color signal components for luminance and the color signal components for color difference to generate color signal components common for luminance and color difference; a processing unit that performs nonlinear processing on the color signal components common for luminance and color difference; a separation unit that generates a luminance signal and color difference signals in a second color space from the signal that has undergone the nonlinear processing; and a band limiting unit that performs band limitation processing on the color difference signals, wherein a characteristic of the band limitation processing is set on the basis of frequency characteristics of the luminance signal and the color difference signals.

Further, according to the present invention, provided is an image capturing apparatus comprising: an image sensor that performs photoelectric conversion on an incident optical image and outputs an image signal; and an image processing apparatus comprising one or more processors and/or circuitry which functions as: a first generation unit that generates color signal components for luminance in a first color space from an input image signal; a second generation unit that generates color signal components for color difference in the first color space from the input image signal; an integration unit that integrates the color signal components for luminance and the color signal components for color difference to generate color signal components common for luminance and color difference; a processing unit that performs nonlinear processing on the color signal components common for luminance and color difference; a separation unit that generates a luminance signal and color difference signals in a second color space from the signal that has undergone the nonlinear processing; and a band limiting unit that performs band limitation processing on the color difference signals, wherein a characteristic of the band limitation processing is set on the basis of frequency characteristics of the luminance signal and the color difference signals.

Furthermore, according to the present invention, provided is an image processing method comprising: generating color signal components for luminance in a first color space from an input image signal; generating color signal components for color difference in the first color space from the image signal; integrating the color signal components for luminance and the color signal components for color difference to generate color signal components common for luminance and color difference; performing nonlinear processing on the color signal components common for luminance and color difference; generating a luminance signal and color difference signals in a second color space from the signal that has undergone the nonlinear processing; and performing band limitation processing on the color difference signals, wherein a characteristic of the band limitation processing is set on the basis of frequency characteristics of the luminance signal and the color difference signals.

Further, according to the present invention, provided is a non-transitory storage medium readable by a computer, the storage medium storing a program that is executable by the computer, wherein the program includes program code for causing the computer to function as an image processing apparatus comprising: a first generation unit that generates color signal components for luminance in a first color space from an input image signal; a second generation unit that generates color signal components for color difference in the first color space from the image signal; an integration unit that integrates the color signal components for luminance and the color signal components for color difference to generate color signal components common for luminance and color difference; a processing unit that performs nonlinear processing on the color signal components common for luminance and color difference; a separation unit that generates a luminance signal and color difference signals in a second color space from the signal that has undergone the nonlinear processing; and a band limiting unit that performs band limitation processing on the color difference signals, wherein a characteristic of the band limitation processing is set on the basis of frequency characteristics of the luminance signal and the color difference signals.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 6 is a diagram showing an example of a band limiting filter characteristic of a band limiting unit according to the first embodiment;

DESCRIPTION OF THE EMBODIMENTS

Exemplary embodiments of the present invention will be described in detail in accordance with the accompanying drawings.

First Embodiment

Figure 1:
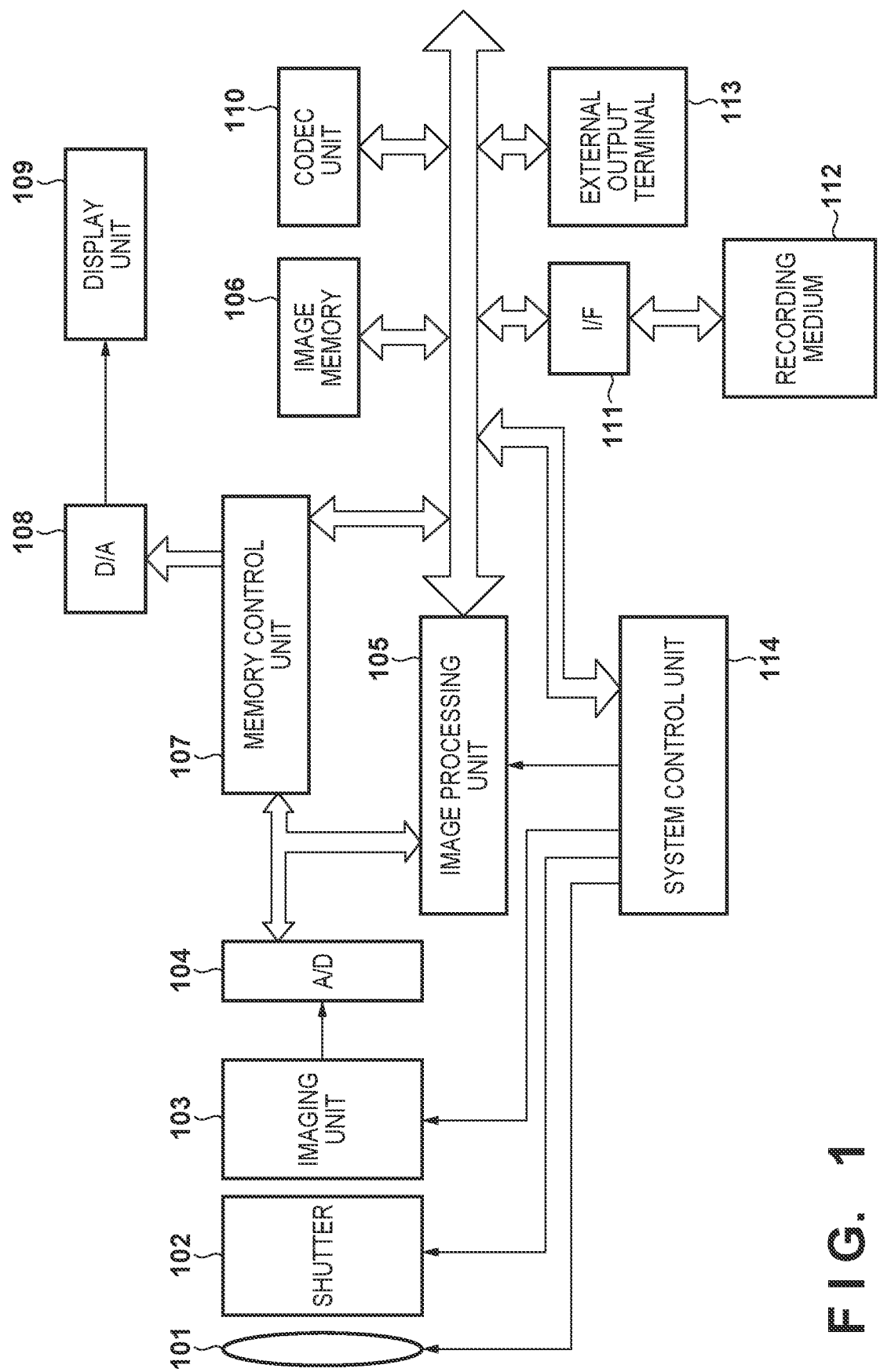
FIG. 1 is a block diagram illustrating a configuration of a digital camera according to first and second embodiments of the present invention.

Hereinafter, a first embodiment of the present invention will be described. FIG. 1 is a block diagram showing a configuration example of a digital camera according to the first embodiment. Referring to FIG. 1, an optical image incoming through a lens group 101 including a zoom lens and a focus lens and a shutter 102 having a diaphragm function is photoelectrically converted into an electrical signal by an imaging unit 103 including a CMOS sensor or the like. In the first embodiment, the imaging unit 103 has a plurality of pixels in which RGB color filters of Bayer array are arranged, and each pixel outputs an electrical signal of any one of the RGB colors.

The converted electrical signal is input to an A/D converter 104 as an analog image signal. The A/D converter 104 A/D-converts the input analog image signal into a digital image signal, and outputs the converted digital image signal to an image processing unit 105. The image processing unit 105 performs various kinds of image processing such as white balance processing, demosaicing, noise reduction, edge enhancement, tone conversion, color correction, etc. on the image data from the A/D converter 104 or image data from a memory control unit 107. Further, the image processing unit 105 generates video signals and image data to be output to a codec unit 110 and an external output terminal 113. The codec unit 110 performs compression encoding and decoding on the video signals and the image data.

The image data output from the image processing unit 105 is written in an image memory 106 via the memory control unit 107. The image memory 106 stores image data output from the imaging unit 103 and image data to be displayed on a display unit 109.

A D/A converter 108 converts the digital image data for display stored in the image memory 106 input via the memory control unit 107 into an analog signal and supplies it to the display unit 109. The display unit 109 performs display in accordance with the analog signal from the D/A converter 108 on a display such as an LCD.

A system control unit 114 controls the entire system of the digital camera and stores the image data encoded by the codec unit 110 in a recording medium 112 via an interface 111. In addition, the system control unit 114 outputs the video signal output from the image memory 106, the image processing unit 105, or the codec unit 110 to an external output device, such as an HDR monitor, connected to the digital camera via the external output terminal 113.

Figure 2:
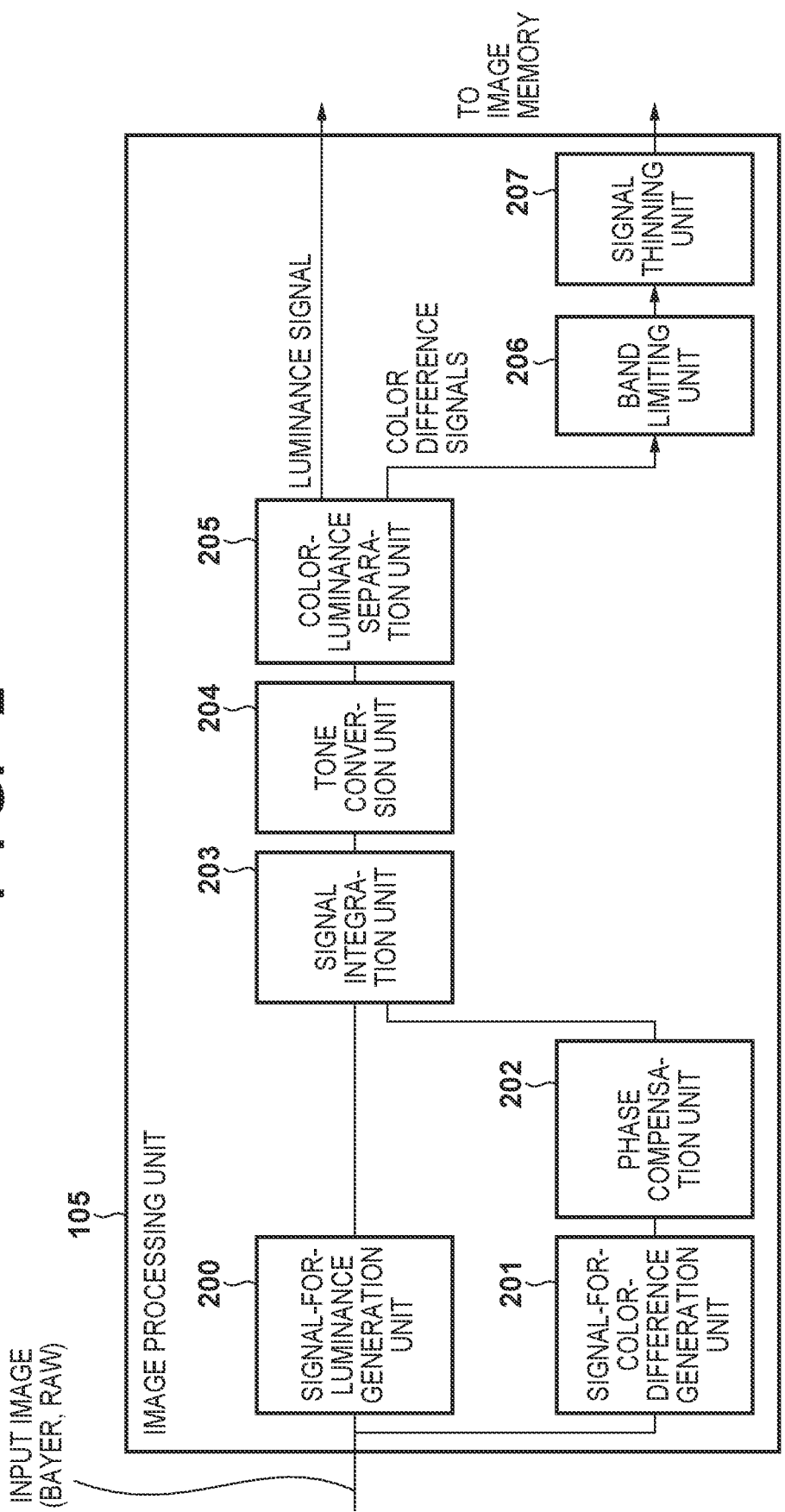
FIG. 2 is a block diagram showing a configuration of an image processing unit according to the first embodiment.

Next, the configuration of the image processing unit 105 will be described with reference to FIG. 2. In FIG. 2, it is assumed that an input image is a Bayer RAW signal obtained by subjecting a digital image signal of a captured image to various correction processing for correcting a known sensor or optical aberration by a processing unit (not shown). A signal-for-luminance generation unit 200 generates color signal components in the RGB color space suitable for a luminance signal from the input image. Further, a signal-for-color-difference generation unit 201 generates color signal components in the RGB color space suitable for a color difference signal from the input image.

Since the human visual system has high spatial frequency response to brightness change, the signal-for-luminance generation unit 200 performs demosaicing, noise reduction, contour compensation and the like on the input image so that the resultant image includes high frequency components. On the other hand, the human visual system has low spatial frequency response to color change. Therefore, the signal-for-color-difference generation unit 201 performs demosaicing, noise reduction, color correction and the like on the input image so as to reduce image quality deterioration components caused by high frequency components, such as noise and aliasing caused by image processing, in the resultant image as much as possible. Further, the signal-for-color-difference generation unit 201 performs thinning processing on signals in the horizontal direction. The thinning processing is performed at an arbitrary timing after the demosaicing processing in the signal-for-color-difference generation unit 201.

Figure 3A:
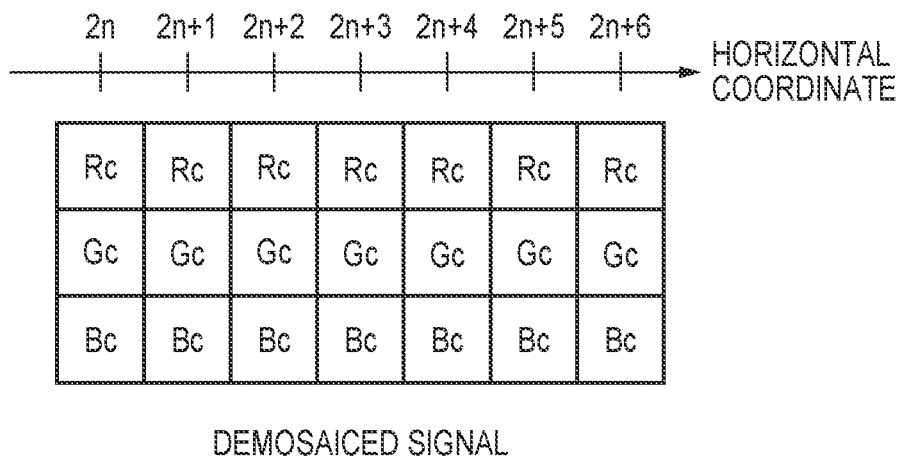
FIGS. 3A and 3B are diagrams showing a thinning processing of RGB signals by a signal-for-color-difference generation unit according to the first embodiment.
Figure 3B:
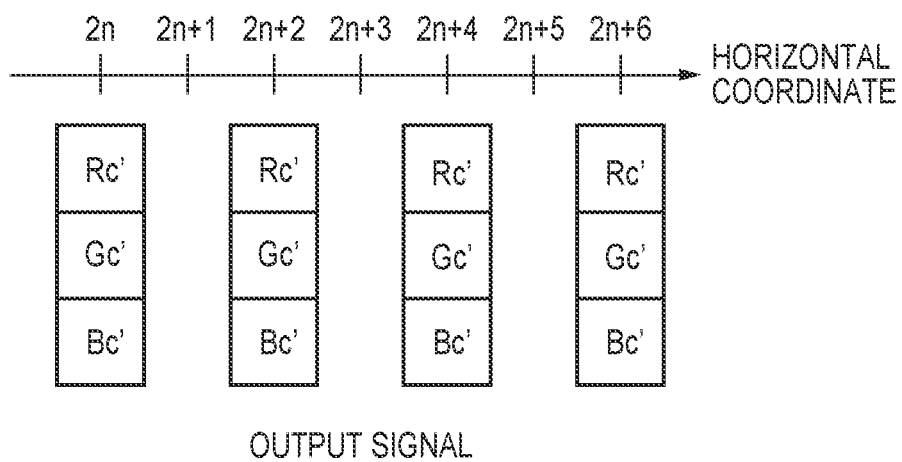

FIGS. 3A and 3B are diagrams for explaining the thinning processing after the demosaicing processing. In the example shown in FIG. 3A, odd-numbered phase signals are thinned out from the demosaiced Rc, Gc, and Bc signals. Here, n is an arbitrary integer. With this thinning processing, only Rc', Gc', Bc' signals of even-numbered phase are obtained as shown in FIG. 3B. The apostrophe (') of the output signals Rc', Gc', Bc' is to show that the signal values have changed due to various signal processing within the signal-for-color-difference generation unit 201.

A phase compensation unit 202 performs phase compensation of the thinned-out odd-numbered phase signals of the RGB value output from the signal-for-color-difference generation unit 201. Here, interpolation processing is performed using signals of the left and right pixels of the compensation target pixel so that the signal after the phase compensation does not cause a centroid deviation with respect to the output signal of the signal-for-luminance generation unit 200 that has not undergo the thinning processing.

Here, the interpolation processing is performed using the following expressions (1) to (6).
In a case where the horizontal coordinate m is an odd number $$Rc''(m)=\{Rc'(m-1)+Rc'(m+1)\}/2 \qquad (1)$$

$$Gc''(m)=\{Gc'(m-1)+Gc'(m+1)\}/2 \qquad (2)$$

$$Bc''(m)\{=Bc'(m-1)+Bc'(m+1)\}/2 \qquad (3)$$

In a case where the horizontal coordinate m is an even number $$Rc''(m)=Rc'(m) \qquad (4)$$

$$Gc''(m)=Gc'(m) \qquad (5)$$

$$Bc'(m)=Bc'(m) \qquad (6)$$

Note that, m is an arbitrary horizontal coordinate value in the expressions (1) to (6).

Figure 4A:
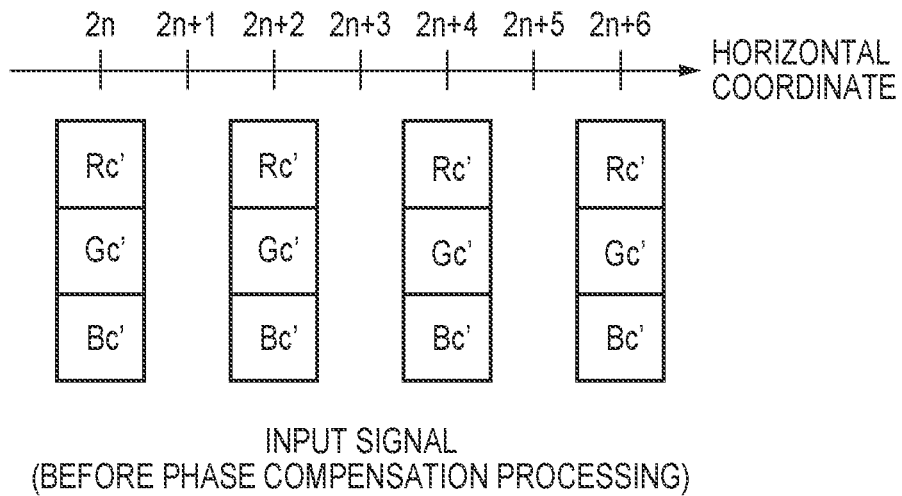
FIGS. 4A and 4B are diagrams illustrating processing by a phase compensation unit according to the first embodiment.
Figure 4B:
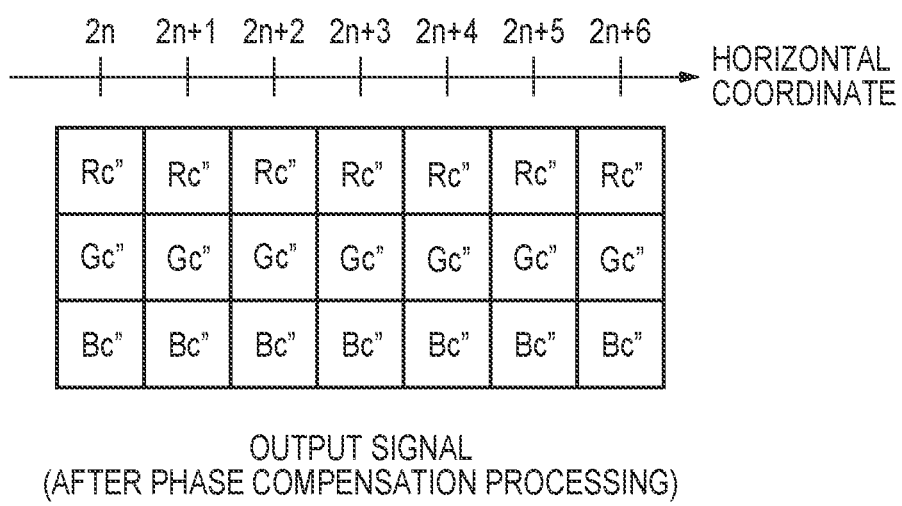

FIGS. 4A and 4B show input signals and output signals of the phase compensation unit 202 according to the first embodiment. By performing the phase compensation processing, the signal values of the odd-numbered phase pixels that have been thinned out before the phase compensation processing as shown in FIG. 4A are generated by the interpolation processing using the pixel values of the left and right even-numbered phase pixels, and output signals shown in FIG. 4B are obtained. Thus, with the above processing, it is possible to obtain output signals having the same centroid positions as those of the output signals of the signal-for-luminance generation unit 200.

A signal integration unit 203 integrates RGB signals of the two systems for the luminance signal and the color difference signal output from the signal-for-luminance generation unit 200 and the phase compensation unit 202 to generate RGB signals of a single system. Expressions (7) to (9) show a processing example performed by the signal integration unit 203.

$$Rmix=Rc''+a\times(Ry'-Rc'')+b\times(Gy'-Gc'')+c\times(By'-Bc'') \qquad (7)$$

$$Gmix=Gc''+a\times(Ry'-Rc'')+b\times(Gy'-Gc'')+c\times(By'-Bc'') \qquad (8)$$

$$Bmix=Bc''+a\times(Ry'-Rc'')+b\times(Gy'-Gc'')+c\times(By'-Bc'') \qquad (9)$$

In the expressions (7) to (9), a, b, and c are arbitrary coefficients and satisfy a+b+c=1. In addition, Ry', Gy', By' are output signals of the signal-for-luminance generation unit 200.

A tone conversion unit 204 performs predetermined tone conversion (nonlinear processing) on the RGB signals output from the signal integration unit 203 to generate the output signals R', G' and B'. Here, the tone conversion processing performed in the tone conversion unit 204 can be expressed as y=f(x) where x is input, y is output, and conversion characteristic is f(x). Therefore, the output signals R', G', B' are obtained by the calculations of expressions (10) to (12) with respect to input Rmix, Gmix and Bmix.

$$R'=f(Rmix) \qquad (10)$$

$$G'=f(Gmix) \qquad (11)$$

$$B'=f(Bmix) \qquad (12)$$

Figures 5A, 5B:
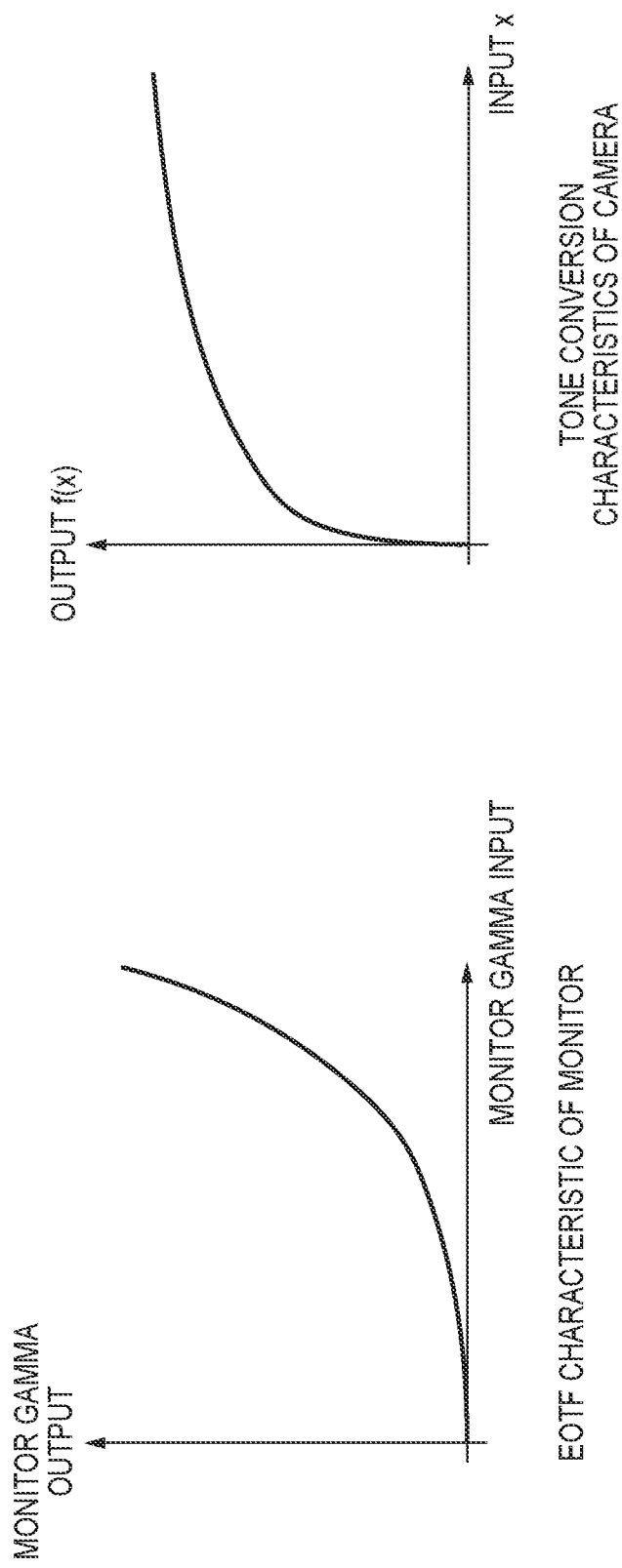
FIGS. 5A and 5B are diagrams showing examples of EOTF characteristics of an HDR monitor and tone conversion characteristics of a camera.

The conversion characteristic f(x) is an inverse characteristic to the EOTF (electrooptical conversion) characteristic defined for an HDR compatible monitor. FIG. 5A shows the EOTF characteristic on the monitor side, and FIG. 5B shows the tone conversion characteristics of the camera.

A color-luminance separation unit 205 separates a luminance signal Y and color difference signals U and V from the RGB signal output from the tone conversion unit 204 by performing the calculations of expressions (13) to (15).

$$Y=a\times R'+b\times G'+c\times B' \qquad (13)$$

$$U=(1-c)\times B'-a\times R'-b\times G' \qquad (14)$$

$$V=(1-a)\times R'-c\times B'-b\times G' \qquad (15)$$

Here, the coefficients a, b, and c are the same values as a, b, and c in the above expressions (7) to (9).

As shown in FIG. 2, the luminance signal Y outputted from the color-luminance separation unit 205 is the unchanged output of the image processing unit 105, but the color difference signals U and V are input to a band limiting unit 206.

The band limiting unit 206 performs filtering processing (band limiting processing) for band limitation on the color difference signals U and V. The reason for performing this filtering processing is as follows. In the signal integration unit 203, the RGB signals for the luminance signal and the RGB signals for the color difference signal are integrated. Then, by generating a color difference signal from the integrated signal, a phenomenon in which a signal in a high frequency band originally not superimposed on the RGB signals for the color difference signal is propagated from the RGB signals for the luminance signal occurs. If thinning processing of the signals is performed in a subsequent signal thinning section 207 while this phenomenon occurs, the signal in the high frequency band will fold back and the image quality of an output image displayed on the monitor will remarkably deteriorate. Therefore, the filter characteristic in the band limiting unit 206 is set in consideration of the frequency characteristics of the luminance signal and the color difference signal. FIG. 6 shows an example of the design of the filter characteristic of the band limiting unit 206. Since the signal thinning unit 207 thins out signals in the horizontal direction, the filter of the band limiting unit 206 is also applied horizontally.

As shown by the broken line in FIG. 6, an ideal filter characteristic of the band limiting unit 206 is such that the gain becomes 0 at the maximum frequency of the color difference signal. Here, the maximum frequencies of the luminance signal and the color difference signals are predetermined values from the respective signal processing contents. In the first embodiment, the filter characteristic of the band limiting unit 206 is as shown by the solid line in FIG. 6 under the condition that the filtering range is up to one pixel each to the left and right of the pixel of interest, and the filter output is a linear combination of pixel values of the respective pixels.

Based on the above characteristic, the band limiting unit 206 performs calculations shown in the following expressions (16) and (17).

$$U'(m)=\{ka \times U(m-1)+kb \times U(m)+kc \times U(m+1)\}/(ka+kb+kc) \quad (16)$$

$$V'(m)=\{ka \times V(m-1)+kb \times V(m)+kc \times V(m+1)\}/(ka+kb+kc) \quad (17)$$

In the expressions (16) and (17), filtering coefficients ka, kb and kc are predetermined coefficients that satisfy the filter characteristic shown in FIG. 6, and m is an arbitrary horizontal direction coordinate.

Figure 7A:
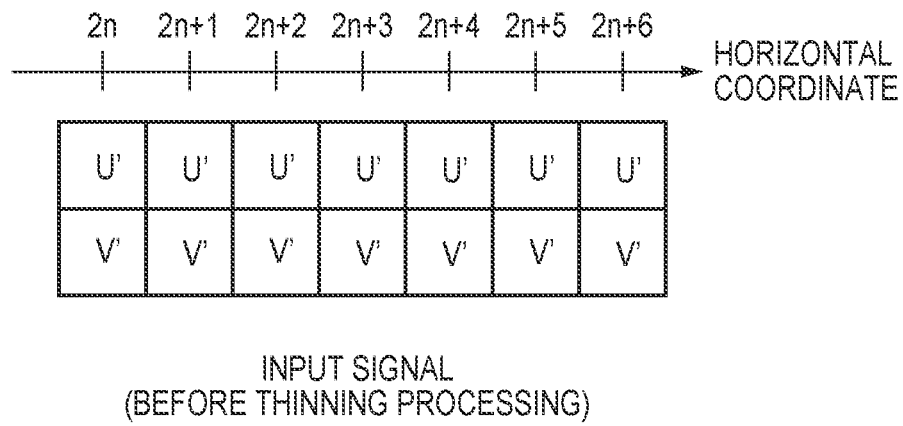
FIGS. 7A and 7B are diagrams illustrating processing by a signal thinning unit according to the first embodiment.
Figure 7B:
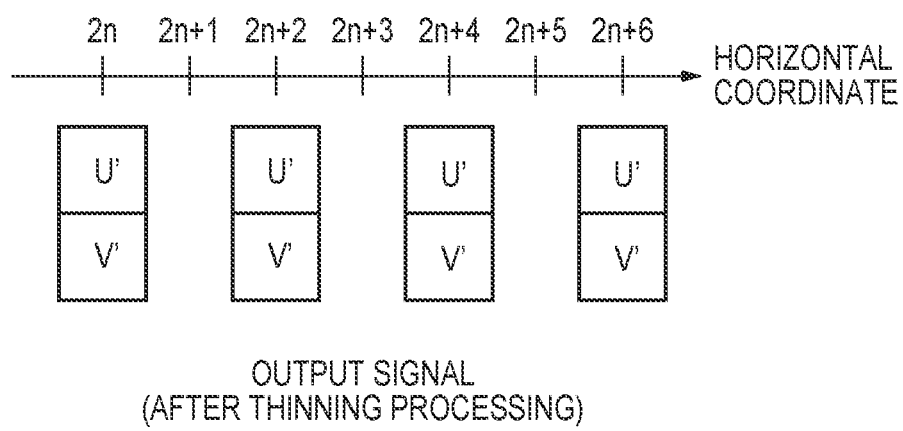

In the signal thinning unit 207, thinning processing of color difference signals U' and V' is performed according to a transmission format of color difference signals. In the present embodiment, in order to transfer the U' signal and the V' signal by time division multiplexing, thinning processing is performed on the luminance signal Y so that the horizontal resolution of the color difference signals U' and V' is halved. This processing is shown in FIGS. 7A and 7B. As shown in FIG. 7A, the odd-numbered phase signals are thinned out from the input signals to obtain the signals shown in FIG. 7B.

Finally, the luminance signal output from the color-luminance separation unit 205 and the color difference signals output from the signal thinning unit 207 are input to the HDR monitor from the image memory 106 or the external output terminal 113 via the codec unit 110.

As described above, the image processing apparatus according to the first embodiment carries out the phase compensation processing of the color difference signals thinned by signal processing for the color difference, and further performs the band limitation processing on the color difference signals generated after the signal integration. Then, by thinning the color difference signals and transmitting them to the HDR monitor, it is possible to suppress a false signal generated when the signals are reproduced on the HDR monitor side, and it is possible to reduce degradation in image quality of a displayed image.

In the example described above, the odd-numbered phase signals are thinned out in the signal-for-color-difference generation unit 201, however, the present invention is not limited to this. For example, the even-numbered phase signals may be thinned out and the even-numbered phase signals may be compensated by the phase compensation unit 202. Namely, signals may be thinned out at a predetermined pixel cycle, and the thinned signals may be compensated by the phase compensation unit 202.

Second Embodiment

Next, a digital camera according to a second embodiment of the present invention will be described. A configuration of the image processing unit 105 of the digital camera in the second embodiment is different from that in the first embodiment. Since the other configuration is the same as that shown in FIG. 1, the configuration and processing contents of the image processing unit 105 in the second embodiment will be described below with reference to FIG. 8. Note that the constituent elements that perform the same operation as those in FIG. 2 are referred to by the same reference numerals, and the explanation thereof is appropriately omitted.

Figure 8:
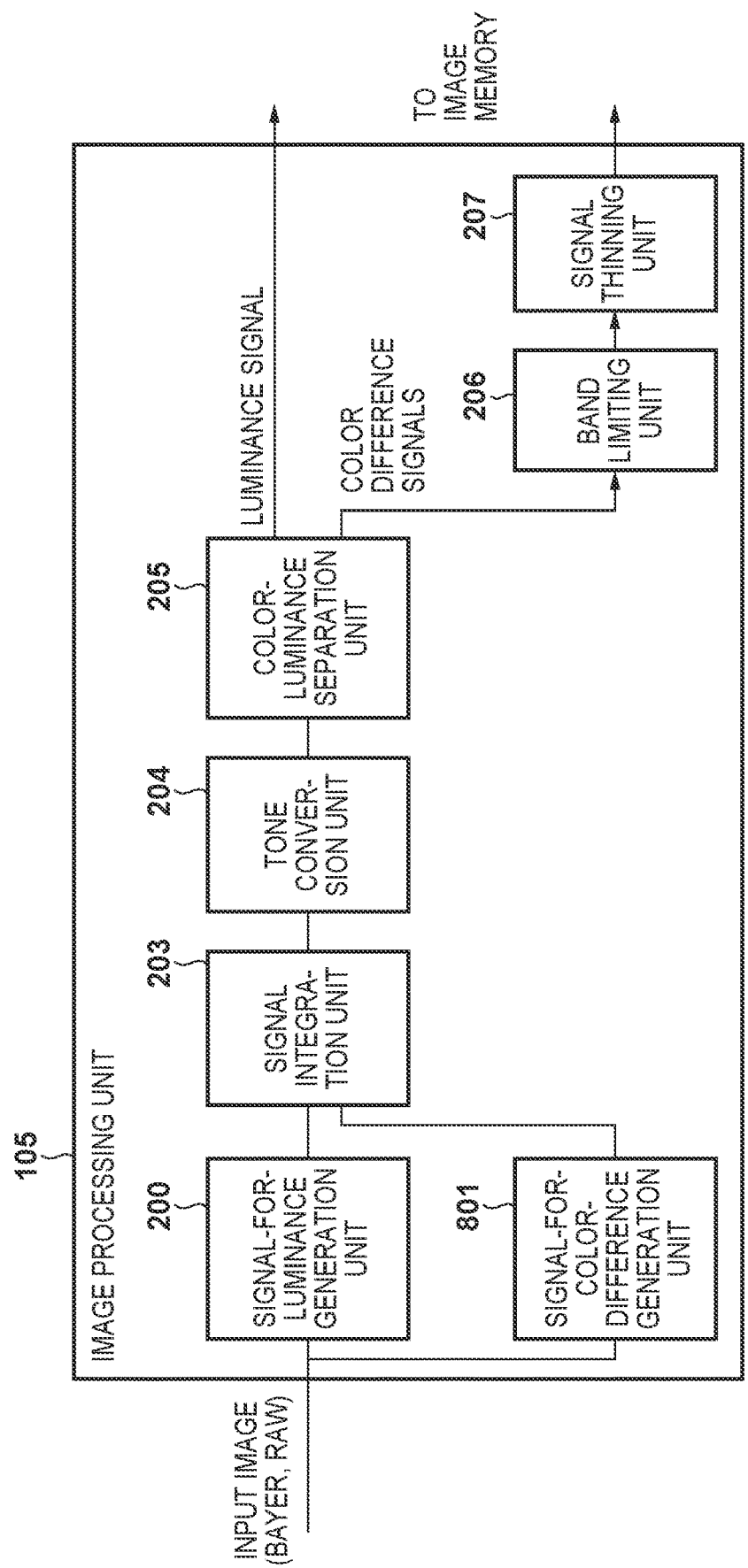
FIG. 8 is a block diagram showing a configuration of an image processing unit according to a second embodiment.
Figure 9A:
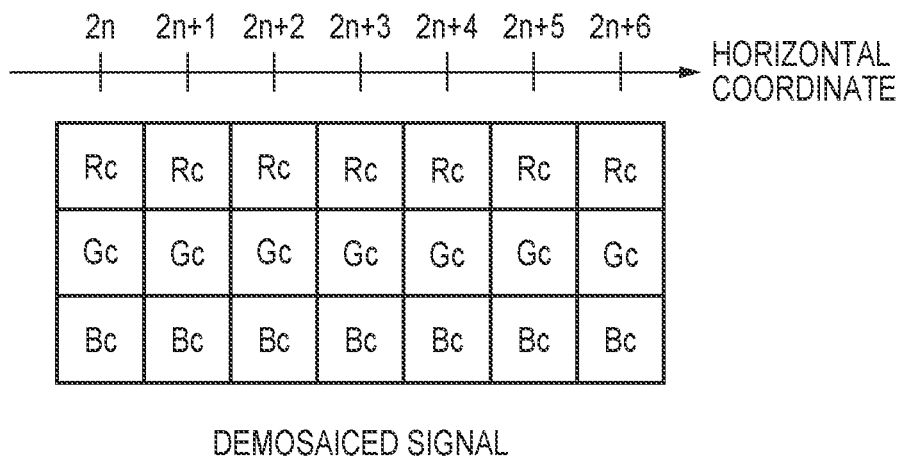
FIGS. 9A and 9B are diagrams illustrating a case where thinning processing of RGB signals is not performed in the signal-for-color-difference generation unit according to the second embodiment.
Figure 9B:
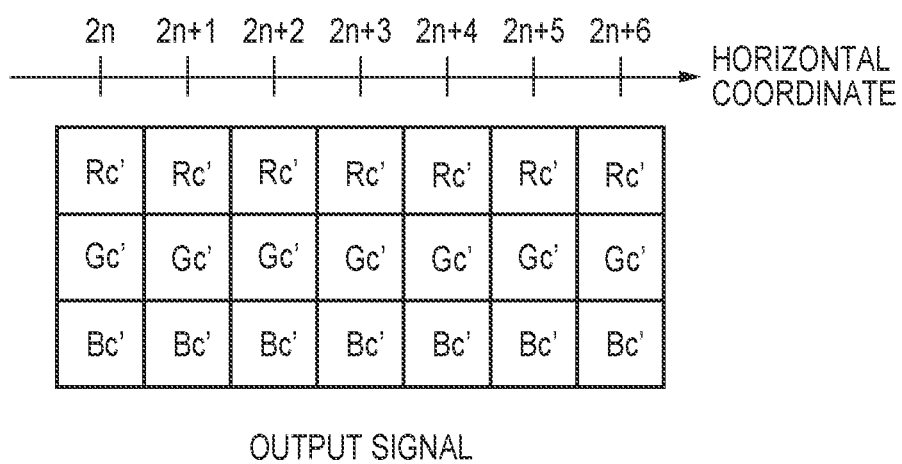

FIG. 8 is a diagram showing a configuration of the image processing unit 105 according to the second embodiment. The signal-for-luminance generation unit 200 generates color signal components in the RGB color space suitable for the luminance signal from an input image. A signal-for-color-difference generation unit 801 generates color signal components in the RGB color space suitable for the color difference signals from the input image. In the second embodiment, the signal-for-color-difference generation unit 801 does not perform thinning processing on the signals in the horizontal direction. Therefore, in the example shown in FIGS. 9A and 9B, with respect to the demosaiced Rc, Gc, and Bc signals shown in FIG. 9A, the Rc', Gc', Bc' signals of the same resolution as shown in FIG. 9B are outputted. Not that the apostrophe (') of the output signals Rc', Gc', Bc' is to show that the signal values have changed due to various signal processing within the signal-for-color-difference generation unit 801. In this case, since it becomes unnecessary to perform the phase compensation processing after generating the color difference signals, the phase compensation unit 202 in the first embodiment becomes unnecessary. The signal integration unit 203 integrates RGB signals of two systems for luminance signals and color difference signals output from the signal-for-luminance generation unit 200 and the signal-for-color-difference generation unit 801 to generate RGB signals of a single system (common for color-difference signals and luminance signal).

However, the phenomenon that the difference in the frequency band due to the difference between the processing of the signal-for-luminance generation unit 200 and the signal-for-color-difference generation unit 801 propagates to the color difference signals by signal integration occurs as in the case described in the first embodiment. For this reason, it is necessary to perform band limiting processing on the color difference signals after signal separation. Therefore, also in the second embodiment, the band limiting unit 206 performs band limiting processing. The concept of filter design in the band limiting unit 206 is the same as that described with reference to FIG. 6 in the first embodiment.

According to the second embodiment as described above, optimum image processing for the signal for luminance and the signal for color difference is respectively performed on the input image, and the luminance signal and the color difference signals are integrated to form a signal of a single system, and then tone conversion is applied. Thereafter, color-luminance separation is performed on the signal after the tone conversion, and band limiting processing based on the difference between the frequency bands of the luminance signal and the color difference signals is performed on the separated color difference signals. Then, by thinning the color difference signals and transmitting them to the HDR monitor, it is possible to suppress a false signal generated when the signals are reproduced on the HDR monitor side, and it is possible to reduce degradation in image quality of a displayed image.

In the first and second embodiments, the color space in which the signal-for-luminance generation processing and the signal-for-color-difference generation processing are performed is the RGB color space, however, processing may be performed in other color spaces of color mixing system, such as the XYZ color space and the LMS color space.

In addition, although the color space in which the color-luminance separation is performed after the tone conversion processing is the YUV color space, however, the processing may be performed in other color spaces of color-luminance separation type, such as the ICtCp color space.

Further, the filter characteristic of the band limiting unit 206 is set on the basis of the spatial frequencies of the color difference signals and the luminance signal, however, it may also be set according to the photographic sensitivity, the characteristics of the tone conversion unit 204, and so forth.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-175797, filed on Sep. 13, 2017 which is hereby incorporated by reference herein in its entirety.

What is claimed is:

1. An image processing apparatus comprising one or more processors and/or circuitry which functions as:
    a first generation unit that generates color signal components for luminance in a first color space from an input image signal;
    a second generation unit that generates color signal components for color difference in the first color space from the image signal;
    an integration unit that integrates the color signal components for luminance and the color signal components for color difference to generate color signal components common for luminance and color difference;
    a processing unit that performs nonlinear processing on the color signal components common for luminance and color difference;
    a separation unit that generates a luminance signal and color difference signals in a second color space from the signal that has undergone the nonlinear processing; and
    a band limiting unit that performs band limitation processing on the color difference signals,
    wherein a characteristic of the band limitation processing is set on the basis of frequency characteristics of the luminance signal and the color difference signals.

2. The image processing apparatus according to claim 1, wherein the second generation unit performs demosaicing processing and then thinning processing at a predetermined pixel cycle on the color signal components for color difference, and
    at least the one processor or the one circuitry also functions as a phase compensation unit that performs phase compensation processing before the integration is performed by the integration unit on the color signal components for color differences that have undergone the thinning processing by the second generation unit.

3. The image processing apparatus according to claim 2, wherein the second generation unit performs the thinning processing every other pixel.

4. The image processing apparatus according to claim 2, wherein the phase compensation processing is to generate a thinned-out color difference signal from at least two color difference signals which are not thinned.

5. The image processing apparatus according to claim 1, wherein the band limiting unit performs the band limitation processing using a filter.

6. The image processing apparatus according to claim 5, wherein the filter has a characteristic that a gain is 0 at a maximum frequency of the color difference signals.

7. The image processing apparatus according to claim 5, wherein the characteristic of the filter is set on the basis of the characteristics of the nonlinear processing performed by the processing unit.

8. The image processing apparatus according to claim 5, wherein the characteristic of the filter is set on the basis of an imaging sensitivity of the image signal.

9. The image processing apparatus according to claim 1, wherein the nonlinear processing performed by the processing unit is based on an inverse characteristic to an electrooptical (EOTF) characteristic defined for a high dynamic range (HDR) compatible monitor.

10. The image processing apparatus according to claim 1, wherein at least the one processor or the one circuitry also functions as a thinning unit that performs thinning processing at a predetermined pixel cycle on the color difference signals which have undergone the band limitation processing by the band limiting unit.

11. The image processing apparatus according to claim 1, wherein the first color space is a color space of a color mixing system.

12. The image processing apparatus according to claim 11, wherein the first color space is an RGB color space, an XYZ color space or an LMS color space.

13. The image processing apparatus according to claim 1, wherein the second color space is a color space of a color-luminance separation system.

14. The image processing apparatus according to claim 13, wherein the second color space is a YUV color space or an ICtCp color space.

15. An image capturing apparatus comprising:
    an image sensor that performs photoelectric conversion on an incident optical image and outputs an image signal; and an image processing apparatus comprising one or more processors and/or circuitry which functions as:
- a first generation unit that generates color signal components for luminance in a first color space from an input image signal;
- a second generation unit that generates color signal components for color difference in the first color space from the input image signal;
- an integration unit that integrates the color signal components for luminance and the color signal components for color difference to generate color signal components common for luminance and color difference;
- a processing unit that performs nonlinear processing on the color signal components common for luminance and color difference;
- a separation unit that generates a luminance signal and color difference signals in a second color space from the signal that has undergone the nonlinear processing; and
- a band limiting unit that performs band limitation processing on the color difference signals,
- wherein a characteristic of the band limitation processing is set on the basis of frequency characteristics of the luminance signal and the color difference signals.

16. An image processing method comprising:
- generating color signal components for luminance in a first color space from an input image signal;
- generating color signal components for color difference in the first color space from the image signal;
- integrating the color signal components for luminance and the color signal components for color difference to generate color signal components common for luminance and color difference;
- performing nonlinear processing on the color signal components common for luminance and color difference;
- generating a luminance signal and color difference signals in a second color space from the signal that has undergone the nonlinear processing; and
- performing band limitation processing on the color difference signals,
- wherein a characteristic of the band limitation processing is set on the basis of frequency characteristics of the luminance signal and the color difference signals.

17. A non-transitory storage medium readable by a computer, the storage medium storing a program that is executable by the computer, wherein the program includes program code for causing the computer to function as an image processing apparatus comprising:
- a first generation unit that generates color signal components for luminance in a first color space from an input image signal;
- a second generation unit that generates color signal components for color difference in the first color space from the image signal;
- an integration unit that integrates the color signal components for luminance and the color signal components for color difference to generate color signal components common for luminance and color difference;
- a processing unit that performs nonlinear processing on the color signal components common for luminance and color difference;
- a separation unit that generates a luminance signal and color difference signals in a second color space from the signal that has undergone the nonlinear processing; and
- a band limiting unit that performs band limitation processing on the color difference signals,
- wherein a characteristic of the band limitation processing is set on the basis of frequency characteristics of the luminance signal and the color difference signals.

* * * * *